US005442509A

United States Patent [19]

Ito et al.

[11] Patent Number: 5,442,509

[45] Date of Patent: Aug. 15, 1995

[54] PROTECTION STRUCTURE FOR SURGE ABSORBING ELEMENT

[75] Inventors: Takaaki Ito, Yokoze; Hiroyuki Ikeda, Tokyo; Naoyuki Tomita, Chichibu; Takashi Shibayama, Yokoze; Tomio Iwata, Yokoze; Takashi Kurihara, Yokoze, all of Japan

[73] Assignee: Mitsubishi Materials Corp., Tokyo, Japan

[21] Appl. No.: 243,083

[22] Filed: May 16, 1994

Related U.S. Application Data

[63] Continuation of Ser. No. 982,412, Nov. 27, 1992, abandoned, which is a continuation of Ser. No. 650,613, Feb. 4, 1991, abandoned.

[30] Foreign Application Priority Data

Feb. 5, 1990 [JP] Japan .................................... 2-24489

Feb. 5, 1990 [JP] Japan .................................... 2-24490

[51] Int. Cl.$^6$ ................................................ H02H 5/04

[52] U.S. Cl. ...................................... 361/104; 361/56; 361/91; 361/124

[58] Field of Search .................. 361/103, 104, 56, 57, 361/54, 111, 117, 118, 119, 124, 91

[56] References Cited

U.S. PATENT DOCUMENTS

| | | | |
|---|---|---|---|
| 3,448,341 | 6/1969 | Casey | 361/56 |
| 3,795,846 | 3/1974 | Ogawa et al. | 361/120 |
| 4,062,054 | 12/1977 | Simokat | 361/119 |
| 4,317,155 | 2/1982 | Harada et al. | 357/235 R |
| 4,477,857 | 10/1984 | Crocker | 361/119 |
| 4,907,119 | 3/1990 | Allina | 361/56 |
| 4,979,071 | 12/1990 | Ito et al. | 361/56 |

*Primary Examiner*—Todd E. DeBoer
*Attorney, Agent, or Firm*—Hoffman, Wasson & Gitler

[57] ABSTRACT

A protection structure for a surge absorbing element for protecting equipment such as communications lines from surges caused by lightning or the like which makes use of a surge absorbing element in parallel with the equipment to be protected and a low melting point metal wire in direct contact with the element and in series therewith. The structure protects the surge absorbing element or assembly from continuous overvoltage or overcurrent which may be generated by a short-circuit of an alternating electric current source and the like.

12 Claims, 2 Drawing Sheets

PROTECTION STRUCTURE FOR SURGE ABSORBING ELEMENT

This is a continuation of application Ser. No. 07/982,412 filed on Nov. 27, 1992 which is a continuation of application Ser. No. 07/650,613 filed on Feb. 4, 1991 both abandoned.

FIELD OF THE INVENTION

The present invention relates to a protection structure for a surge absorbing element which is protected from overvoltage or overcurrent. Particularly, it relates to a protection structure for a surge absorbing element with improved assembly on a substrate, and with less thermal influence to the substrate. This structure can protect a surge absorbing element or assembly from a lightning surge as well as from continuous overvoltage or overcurrent which may be generated by a short-circuit of an alternating electric current source and the like.

DESCRIPTION OF THE PRIOR ART

A surge absorbing element as disclosed in Japanese Patent Publication No. 63-57918 (Japanese Patent No. 1,508,990) and U.S. Pat. No. 4,317,155 was proposed for protecting equipment such as a communication line, e.g. a telephone line for telephones and telecopiers, a telephone switch board and a line for cable televisions and cable radios and the like, from a surge such as a lightning surge. This surge absorbing element (surge absorber) comprises: a plurality of conductive ceramic thin films formed on the surface of a molded insulating body and separated from each other by an extremely narrow gap; electrodes composed of a metallic material fixed to both ends of the plural conductive thin films and the conductive thin films being inactivated by an inert gas sealing in one certain space.

A surge absorbing element has the general characteristic of when the voltage charged on an element is lower than the critical voltage of the element, the element has high resistance, but when the voltage charged on the element is higher than the critical voltage, the resistance of the element is drastically lowered to several ten ohm. Therefore, when continuous over-voltage or overcurrent is charged to the element, the current will continue to be discharged through the element to cause overheating, and there will then be a possibility of a fire occurring in tile element, or the equipment.

It can not be predicted in common cases to charge continuous overvoltage or overcurrent in a surge absorbing element, but the concept that safety measures to ensure maximum safeness should be taken in view of accidental case are spreading. In one example, Underwriter's Laboratories Incorporated in United States of America set regulations under considerations relating to the firing generated by charging continuous overvoltage or overcurrent to a circuit.

Further, a surge absorbing element has been used when assembled on a substrate with a cover glass housing of the surge absorbing element directly in contact with the substrate. Therefore, the heat of the surge absorbing element as generated by applying overvoltage or overcurrent to the element will have an affect through the cover glass layer directly to the substrate assembled, so as to cause overheating or a fire.

For an overvoltage or overcurrent, a fuse is provided which is broken by an electric current generated in the fuse itself or by the generation of heat from the surge absorbing element, so that the circuit is opened, thereby protecting the element from firing.

For an overvoltage or overcurrent, both for a surge absorbing element and a fuse, they can not function in the case where the value of the element voltage is lower than the response voltage value. Where the value of the electric current is lower than the breaking current value of the fuse, the circuit remains in a closed condition. Thus, no protection of the circuit can be realized.

In case of the recent semiconductor circuit, a Zenor diode is connected in parallel to the circuit in order to attain a protection thereof. In this case, all of the overcurrent, as generated, is directed into the Zenor diode, so that the surge absorbing element does not operate properly, thereby causing the Zenor diode to be overheated under an electric current lower than the melting temperature.

In the other words, heretofore, protective networks for protecting the equipment from overvoltages have employed a spark gas surge absorbing element to shunt overvoltage and excessive currents from the input conductor to ground, and further have employed a series connected fuse for disconnecting or open circuiting to the source of overvoltage or current from the equipment to be protected. Such a protective network is described in U.S. Pat. Nos. 3,448,341 and 3,795,846 and NASA Tech. Brief No. 69-10490, Oct. 1969.

Further, there have been published Japanese Patent Laid-open Publication Nos. 63-00725, 63-205026/1988 and 64-77426/1989 as measures to resolve the case where the short-circuit with a source such as an alternating current source of 600 volt occurs, each of which discloses, respectively, a method of preventing overheating and fire of a surge absorbing element by opening the circuit with a melting fuse, or by contacting a low-melting point metal wire with the surface of a microgap surge absorbing element so that the heat generated by overvoltage or overcurrent charged in the surge absorbing element will melt the low melting point wire, thereby, opening the circuit.

In the above-mentioned methods, because a fuse and a low melting point metal wire are fused or melted, a telephone or cable television can not be used even after the short-circuit is dissolved. A fuse or a low melting point metal wire can protect the surge absorbing element from overheating generated by continuous discharging through a microgap surge absorbing element.

Many attempts have been made to resolve these problems in a protection circuit for protecting a communication line and telephone switchboard, and the like, from both a lightning surge and an overvoltage or overcurrent.

SUMMARY OF THE INVENTION

With the foregoing considerations in mind, the present invention contemplates the provision of an improved protection structure of a surge absorbing element.

It is an object of the present invention to provide a structure for protecting the surge absorbing element from continuous charging overvoltage or overcurrent.

It is another object of the present invention to provide a protection structure in which a low melting point metal wire is mounted on the surface of a gap type or microgap type surge absorbing element, and the space of the neighborhood of such mounting is covered or housed by an inorganic housing.

It is a further object of the present invention to provide a protection structure which will not generate firing, not overheat in the microgap surge absorbing assembly even when the structure is affected by a short-circuit with the electric source.

It is a further object of the present invention to provide a protection structure in which a lead wire is to be fused and protected from the overvoltage or overcurrent, and a surge absorbing element is fixed on pins mounted to a base plate, and the wire being in contact with the surface of the element, about at the center of the cylindrical surface thereof.

DETAILED DESCRIPTION OF THE PREFERRED EMBODIMENTS

Figure 1:
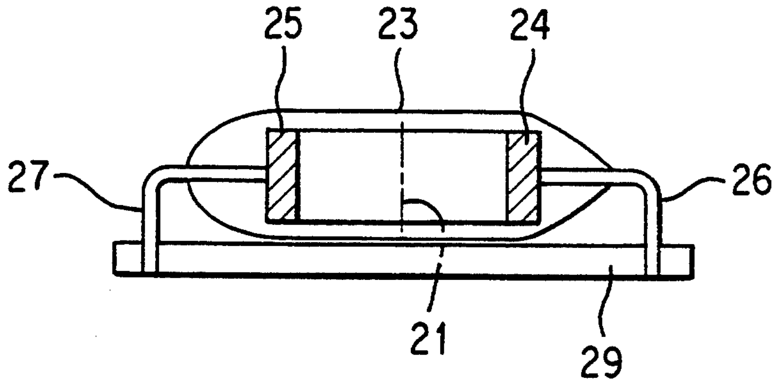
FIG. 1 PRIOR ART
FIG. 1 shows schematically the prior art protection structure of a surge absorbing element, wherein a microgap 21 for discharging overvoltage is provided on a conductive surface layer, which is mounted in a gas filled space.

In accordance with the present invention, a protection structure for protecting a surge absorbing element comprising an electrical source connected to the equipment or structure for supplying current to the equipment or the structure; a surge absorbing device arranged in parallel with the equipment or the structure for absorbing a surge from said electrical source to the equipment or the structure; a low melting point metal wire arranged in series with the equipment or the structure, at a position between the electric source and the surge absorbing means.

In accordance with the present invention, a low melting point metal wire can be wound one or more times around the surface of the surge absorbing element, to improve the response rate of the wire. The function of protecting the element from overvoltage or overcurrent is to protect the element from overvoltage or overcurrent by fusing or melting the low melting point metal wire to open the circuit, when an overvoltage or overcurrent is applied thereto.

The wire can be introduced along the direction of the axis of the surge absorbing element within the housing, so as to allow the wire in contact with the surface of the element.

When an overvoltage or overcurrent is applied to the surge absorbing element, the heat generated in the element will be distributed onto the surface of the element. The temperature of the center of the cylindrical surface of the element will be the highest. Where the wire, extending on the center surface, is not enough long, an inorganic housing, which covers the surge absorbing element and the wire, should be used.

In accordance with the present invention, a substrate for the protection structure is a base plate to which pins of 0.5 to 1.0 mm in diameter are fixed. The base plate may be made of epoxy resin or PBT (polybutylene terephthalate) resin. Further, the base plate has a structure with the edges to which an inorganic housing or cover glass housing can be mounted. The inner diameter of the housing is just larger than the outer diameter of the surge absorbing element, so as to allow the wire to be introduced into the space between the housing and the element. The total length of the housing is longer than the length of the element. The housing is fixed on the substrate by resin.

The element and the wire being in contact together in combination are inserted within the housing, and both terminals of the element are fixed on the top of pins, and both ends of the wire are fixed on the top of other pins. The fixing can be done by soldering or spot welding. Such structure includes the housing mounted on a base plate, the element and the wire is enveloped by a cover case, or a casing made of a resin which is the same resin as that of the base plate. In this structure, the low melting point metal wire is in contact with the surface of the element along the line of the outer cylindrical surface, and a space is provided between the housing and the element, and direct conduction of the heat generated in the element to the housing can be avoided.

In accordance with the other preferred embodiment of the present invention, the low melting point metal wire is fixed in contact with the circumference of the cylindrical surface of the surge absorbing element, at which the temperature is highest, so that the protection of the element can be ensured without an inorganic housing.

Because the wire is in contact with the center of the cylindrical surface of the surge absorbing element in a circumferential direction, the heat of the element can easily conduct to the wire so as to improve the response of the protection structure. Therefore, the structure does not need an inorganic material housing, and, can be simple, so as to facilitate the assembling of the protection structure of the surge absorbing element. Both terminals of the element and both ends of the low melting point metal wire are fixed respectively and independently on the tops of the pins fixed to the resin base plate. Therefore, the process of assembling the protection structure of the surge absorbing element can be efficient and improved.

Preferably, the used low melting point metal has a melting point at the temperature range of 300° C. to 980° C.

In accordance with the present invention, the current flowing through the protection structure can be shunted by opening the circuit, as produced in the protection structure by fusing or melting the fuse of the low melting temperature metal wire, when an overvoltage or overcurrent is applied to the structure, e.g. by a short-circuit to the electric source.

A surge absorbing element is arranged in parallel with the equipment to be protected, and a low melting point metal wire is connected in series to both the equipment to be connected and the surge absorbing element so as to form a protection structure. Therefore, the protection circuit can be opened with fusing or melting (irreversible dissolution) of a fuse or a low melting point metal wire, where overvoltage or overcurrent is applied to the element e.g. by interconnecting of the structure with an electric source. In other words, the electric current flowing through the microgap surge absorbing element can be shunted by fusing or melting the low melting point metal so as to avoid overheating and firing of the structure and the substrate.

The combination of the gap surge absorbing element and the low melting point metal enable one to correctly control the structure.

When excessive current flows through the low melting point metal wire, it is heated so as to increase drastically the temperature. Or, when the overvoltage current flows continuously or is discharged through the surge absorbing element to generate an overheat around the element, the low melting point metal wire is heated and melted to open the circuit. The inventive protection structure utilizes this feature of the low melting point metal wire.

Figure 2:
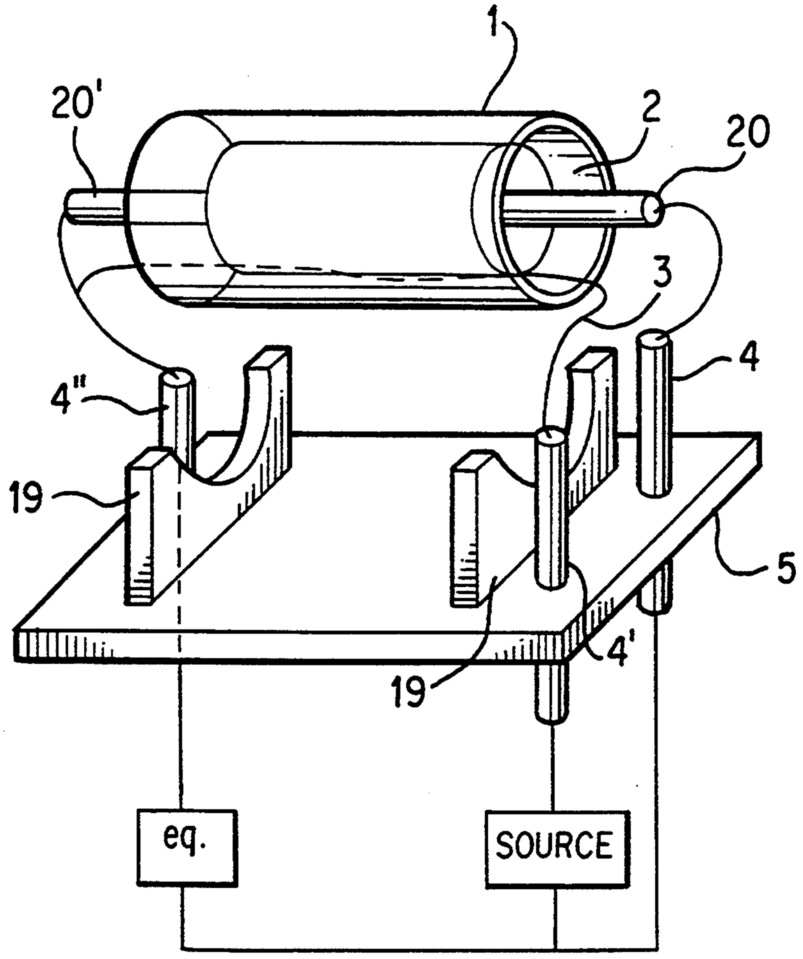
FIG. 2 shows schematically a protection structure according to the present invention, which comprises a microgap surge absorbing element 2 arranged in parallel with the equipment to be connected, and a low melting metal wire 3 mounted in contact with the surface of the surge absorbing element 2 arranged in series with the surge absorbing element.

The protection structure of the present invention has the structure as shown in FIG. 2. A surge absorbing element 2 is arranged in parallel with an equipment to be protected and the surge absorbing element. A low melting point metal wire 3 is connected in series with the equipment to be protected.

Such low melting point metal has preferably a melting point temperature of 300° C. to 980° C. When the temperature of the wire is raised to the critical temperature of the metal, the protection structure can be operated at the use temperature of the equipment to be protected. When the temperature excess 980° C., the heat can affect the resin of the substrate, and the substrate structure can be dangerous.

The present invention is further illustrated by the following examples to show the inventive structure, but should not be interpreted for the limitation of the invention.

EXAMPLE 1

FIG. 2 shows an embodiment of the protection structure, wherein a lead pin 4 of 0.8 mm in diameter, and 10.0 mm in length is mounted on a base 5 which is made of polybutylene terephthalate (PBT).

A surge absorbing element 2 has an outer size of 7.0 mm in length and 3.3 mm in diameter, and a low melting point metal wire as used is a zinc wire 3. An inorganic material housing is a tubular lead glass housing 1 of 10.0 mm in length, and 3.7 mm in inner diameter.

A housing 1 is mounted on a base 5 as shown in FIG. 2 and within the housing, a surge absorbing element 2 and a low melting point metal wire 3 are inserted, and mounted to pins 4 by soldering. As illustrated, the terminal 20 of the surge absorbing element connects with pin 4 which connects with one end of the source and the equipment. The low melting point metal wire 3 connects with the electrode 4′ which connects with the other terminal of the source, and the terminal 20′ of the source absorbing element and the other end of the low melting point metal wire 3 connect together, and with the pin 4″.

Further, the housing 5 is covered with a casing (not shown) made of PBT resin and having the size of 9×9×18 mm.

The protection structure of the surge absorbing element as shown in FIG. 1 (prior art) was mounted directly on a substrate made of paper and phenol (resin overcoated paper substrate) to form a comparison test piece. Then, the inventive protection structure was mounted directly on the same substrate to form a test piece.

Alternating current of 60V-2.2A was applied to each of the test pieces. The response times (time for shunting or discontinuing the overvoltage current) and the state of the paper phenol substrates were measured and reviewed. The result is shown in Table 1.

TABLE 1

| | Prior Art | This Embodiment |
|---|---|---|
| Response Time: | firing with 2 to 6 seconds | shunting within 2 to 6 seconds |
| State of Substrate: | partly dissociated | no change |

The above mentioned two species of the protection structures were tested by charging overvoltage of 600 V and overcurrent of 2.2A in an alternating current fashion. In the protection structure as shown in FIG. 2, the low melting point wire fused at 2 to 6 seconds after applying the overvoltage (connecting to the source 11), the structure can be protected without firing of the surge absorbing element.

Both the element 2 and the wire 3 are provided within the space of the inorganic housing 1, and the heat generated by the charged or applied overvoltage or overcurrent will make the wire fuse or melt so as to open the circuit of the protection structure. Further, it enables minimization of the heat conduction through the housing to the outside component, e.g. the resin base plate, so that the substrate is not affected so as to improve the safety of the protection structure.

The surge absorbing element as shown in FIG. 1 (prior art) does not use a low melting point metal wire. In such structure, the element 23 and the substrate may be fired or dangerous, when the continuous overvoltage or overcurrent is applied. In such prior art structure, lead wires 26 and 27 are arranged in parallel with the source and the equipment to be protected. Therefore, when continuous overvoltage current is applied, the element may be fired or ignited.

In the inventive protection structure of example 1, fixing of both surge absorbing element and low melting point wire is exerted only by pins mounted on a base plate, and then the assembly of the structure can be done by only soldering or welding on the pins, and the assembling can be done in one direction due to such structure. Therefore, the efficiency of assembling the structure can be significantly improved.

The inventive protection structure comprises a microgap surge absorbing element 2 having the discharging voltage of 400 V-DC adjacently provided with a low melting point wire 3 with a melting point of about 400° C.

In the protection structure as shown in FIG. 2, the low melting point metal wire fused at about 2 seconds after charging the overvoltage (connecting to the source), the structure can be operated without firing of the surge absorbing element.

In the inventive protection structure as shown in FIG. 2, the current flowing through the microgap surge absorbing element can be shunted at about 2 seconds after charging the overvoltage (connecting with the source), but no firing was found in the structure.

EXAMPLE 2

Figure 3:
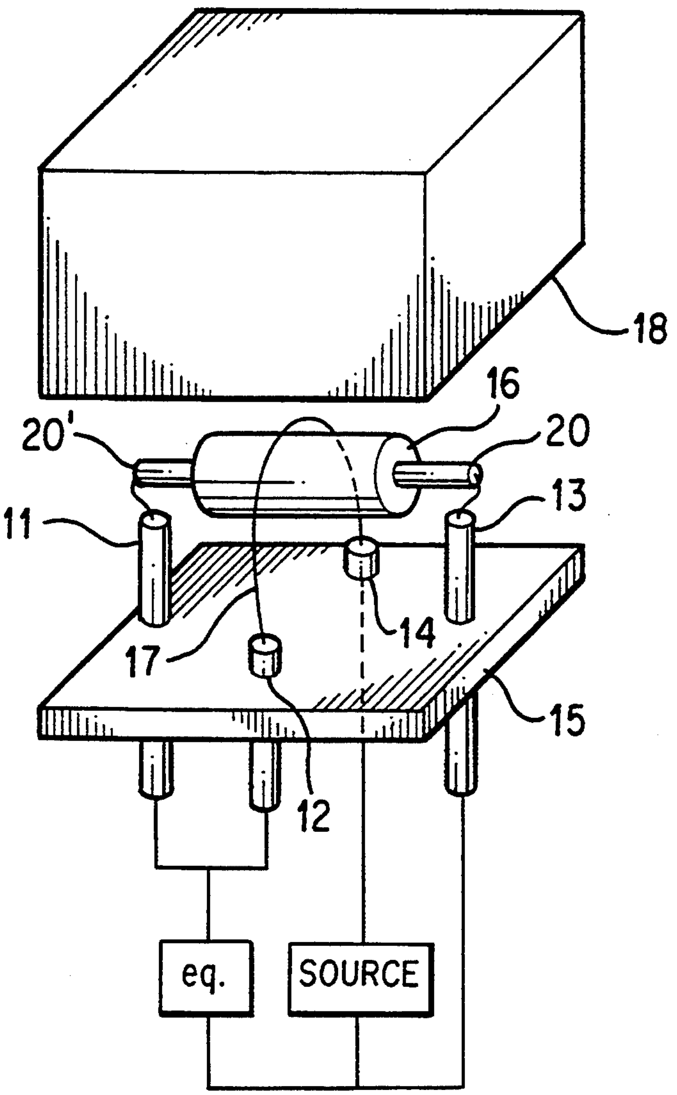
FIG. 3 shows schematically another protection structure of the present invention, in which a low melting point metal (e.g. zinc alloy) wire 17 is mounted in contact with the surface of a surge absorbing element 16 at a central spherical line.

FIG. 3 shows the protection structure, where a microgap surge absorbing element 16 is mounted on pins (Fe-Ni wire) 11 and 13, and a low melting point metal (zinc) wire 17 is mounted on pins 12 and 14 with the wire in contact with the surface of the microgap surge absorbing element 16. Terminal 20 of the surge absorbing element connects with the pin 13 which connects with one end of the source and the equipment. Pin 14 of the low melting point metal wire 17 connects with the other terminal of the source, and the terminal 20' of the surge absorbing element connects with the pin 11 which connects together with the other end of the low melting point metal wire 17 to connect with the other end of the equipment.

The pins have a diameter of 0.8 mm with a reduced diameter at the center, and are fixed to a base 15 to form the structure as shown in FIG. 3. The length of each of the pins, 11 and 13, is 10.0 mm, and the length of each of the pins, 12 and 14, is 6.0 mm.

The microgap surge absorbing element 16 has a discharging voltage of 300 V, and a size of 7.0 mm in outer length, 3.3 mm in outer diameter. Both of the terminals of the element 16 are mounted on the tops of the pins, 11 and 13, by spot welding, and the zinc wire 17 is arranged in contact with the surface of the surge absorbing element 16 around the center thereof in its circumferential direction, and the wire is mounted on the tops of pins, 12 and 14, at both their ends.

Further, a casing 18 made of PBT resin is provided with the microgap surge absorbing element 16 and the zinc wire 17, and all mounted on a base 15.

Alternating current of 600 V-2.2A was applied to each of the protection structures of this example and the structure as shown in FIG. 1 (prior art). The response times (time for shunting or discontinuing the overvoltage current) and the state of the paper phenol substrates were measured and reviewed. The result is shown in Table 2.

TABLE 2

| | Prior Art | This Embodiment |
|---|---|---|
| metal wire | none | zinc wire |
| cover glass | lead glass | none |
| applied voltage | AC 600 V 2.2A | AC 600 V 2.2A |
| Response Time: | firing with 2 to 6 seconds | shunting within 2 to 6 seconds |
| State of Substrate: | partly dissociated | no change |

The above mentioned two species of protection structures were tested by charging overvoltage of 600 V and overcurrent of 2.2 A.

In the protection structure as shown in FIG. 3, the low melting point metal wire fused at 2 to 6 seconds after applying the overvoltage (connecting to the source), the structure was protected without firing of the surge absorbing element.

In the inventive protection structure as shown in FIG. 3, the current flowing through the microgap surge absorbing element was shunted at about 2–6 seconds after applying the overvoltage (connecting with the source), but no overheating or firing was found in the structure.

As shown in FIG. 3, this protection structure comprises a low melting point metal wire 17 in contact with the surface of the element 16 at the center thereof in a form extending around the circumference thereof, and therefore, shunting of the overvoltage current can be easily done even without cover glass housing, when overvoltage or overcurrent is applied thereto.

The usual heat that is generated by applying an overvoltage or overcurrent to the surge absorbing element is prevented from affecting the substrate, so as to improve the safety of the equipment.

The terminals of the surge absorbing element are settled on the pins mounted in the substrate, and the wire is fixed through the pins on the base. Therefore, assembling of the protection structure can be facilitated, so as to improve the efficiency of making the structure for the surge absorbing element.

The inventive protection structure for protecting a gap absorbing element from overvoltage or overcurrent will provide the following significant effects:

Firstly, it enables minimization of the influence to the outside of the overheating of the surge absorbing element, and further it avoids firing of the communication equipment;

Secondly, it improves the efficiency of assembling or making the structure of the surge absorbing element, because the structure is simplified in using pins fixed on a resin base;

Thirdly, the heat generated in the surge absorbing element can conduct easily to the low melting metal wire so as to fuse or melt the metal wire, improving the shunting response time.

The advantage of the protection structure of the present invention is that it provides both personal and equipment protection from overvoltage and overcurrent which will generate overheat or the firing of the surge absorbing element. Its simplicity results in a large cost reduction over other methods. In addition, the protection structure is passive except for the condition of overload, therefore, it results in no need for calibration.

We claim:

1. A protection structure for protecting a surge absorbing element, comprising:

a gap discharging surge absorbing element, arranged in parallel with equipment to be connected, for absorbing a surge from one of an outside overvoltage or outside overcurrent;

a low melting point metal wire connected in series with said surge absorbing element, wherein said wire is mounted in direct contact with the surface of said surge absorbing element.

2. A protection structure according to claim 1, wherein said low melting point metal is a temperature fuse having a melting point of 300° C. to 980° C.

3. The protection structure according to claim 1, wherein said surge absorbing element and said wire are provided within an inorganic material housing having a diameter just longer than the diameter of said element, both ends of said housing affixed to a base plate.

4. The protection structure according to claim 3, wherein both terminals of said surge absorbing element are fixed on pins affixed to said base plate, and wherein said wire has ends also fixed on said pins affixed to said base plate.

5. The protection structure according to claim 1, wherein said element is cylindrical and said low melting point metal wire is mounted in contact with a portion of the surface of said element along a straight tangent line of the cylindrical surface thereof, and wherein said element has terminals fixed separately on pins located on a base plate, and wherein said wire has ends fixed on said pins on of said base plate, said element and wire being enveloped in a cylindrical casing.

6. The protection structure according to claim 5, wherein said low melting point metal wire is mounted along said center portion of said element in a circumferential manner wherein its ends are affixed to a second set of pins on said base plate.

7. The protection structure according to claim 5, wherein said low melting point metal wire has a melting point from 300° C. to 980° C.

8. A protection structure for protecting a surge absorbing element comprising:

a cylindrical gap discharging surge absorbing element having first and second terminals, said element being arranged in parallel with equipment to be protected, for absorbing a surge from overvoltage or overcurrent; and a low melting point metal wire having first and second ends, connected in series with said surge absorbing element, wherein said wire is mounted in direct contact with said element along a straight tangential line along said elements cylindrical surface;

wherein said terminals of said element and said ends of said wire are fixed on pins attached to a base plate of said structure.

9. A protection structure as claimed in claim 8, wherein said cylindrical surge absorbing element and said low melting point metal wire are enveloped in an inorganic cylindrical housing having a diameter slightly greater than that of said element.

10. A protection structure as claimed in claim 8, wherein said low melting point metal wire has a melting point at the temperature of 300° C. to 980° C.

11. A protection structure for protecting a surge absorbing element comprising:

a cylindrical gap discharging surge absorbing element having first and second terminals, said element being arranged in parallel with equipment to be protected for absorbing a surge from overvoltage or overcurrent; and a low melting point metal wire having first and second ends, connected in series with said surge absorbing element, wherein said wire is mounted in direct contact with said element, in a circumferential pattern along the center of said elements' cylindrical surface;

wherein said terminals of said element and said ends of said wire are fixed on pins attached to a base plate of said structure.

12. A protection structure as recited in claim 11, wherein said low melting point metal wire has a melting point at the temperature of 300° C. to 980° C.

* * * * *